(12) United States Patent
Kawabe (10) Patent No.: US 6,270,268 B1
(45) Date of Patent: *Aug. 7, 2001

(54) KEYBOARD APPARATUS

(75) Inventor: Shigeru Kawabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/590,257

(22) Filed: Jun. 9, 2000

Related U.S. Application Data (63) Continuation of application No. 09/313,633, filed on May 18, 1999, now Pat. No. 6,139,207.

(30) Foreign Application Priority Data

Aug. 10, 1998 (JP) .................................. 10-226065

(51) Int. Cl.[7] ...................................................... B41J 5/14
(52) U.S. Cl. ...................... 400/488; 400/490; 400/495.1; 200/344
(58) Field of Search ................................... 400/472, 479, 400/479.1, 479.2, 480, 481, 488, 490, 491, 491.1, 491.2, 495, 495.1, 496, 680, 682; 200/344; 361/680

(56) References Cited

U.S. PATENT DOCUMENTS

| | | | |
|---|---|---|---|
| 5,695,047 | 12/1997 | Tanahashi | 200/344 |
| 5,735,390 | 4/1998 | Takagi et al. | 200/344 |
| 5,767,464 | 6/1998 | Dyer et al. | 200/344 |
| 5,793,605 | 8/1998 | Sellers | 400/682 |
| 5,874,696 | 2/1999 | Hayashi et al. | 400/490 |
| 5,971,637 | * 10/1999 | Malhi et al. | 400/491.2 |

FOREIGN PATENT DOCUMENTS

| | | |
|---|---|---|
| 61-80718 | 4/1986 | (JP) . |
| 5-290673 | 11/1993 | (JP) . |
| 5-298000 | 11/1993 | (JP) . |
| 6-36649 | 2/1994 | (JP) . |
| 8-22348 | 1/1996 | (JP) . |

* cited by examiner

Primary Examiner—John S. Hilten
Assistant Examiner—Leslie J. Grohusky
(74) Attorney, Agent, or Firm—Sughrue, Mion, Zinn Macpeak & Seas, PLLC (57) ABSTRACT

A key base side pivot point on one side of a pantograph is supported on a key base and a key top height adjusting mechanism that has a holder that supports the other key base side pivot point and a reciprocating link that links swingably to this holder is also supported thereon, the holder of this key top height adjusting mechanism being caused to swing by a reciprocating movement of the reciprocating link.

5 Claims, 6 Drawing Sheets

KEYBOARD APPARATUS

This is a continuation of application Ser. No. 09/313,633 filed May 18, 1999, now U.S. Pat. No. 6,139,207, the disclosure of which is incorporated herein by reference.

BACKGROUND OF THE INVENTION

1. Field of the Invention

The present invention relates to a keyboard apparatus that is suitable for in use applications such as notebook-type personal computers.

2. Description of the Related Art

Portable personal computers generally have a main unit and a key top cover, the main unit having a keyboard which resiliently supports a large number of key tops. The key top cover of the personal computer typically has an LCD display on its reverse side, and is pivotally supported on the main unit to allow it to swing freely.

In a personal computer configured as noted above, when the computer is to be used the closed computer cover is swung into the open position, thereby exposing both the liquid-crystal display and the keyboard to the outside.

When carrying the above-noted computer, the cover of the personal computer is swung into the closed position so that the liquid-crystal display and keyboard are covered, therewith.

In this type of personal computer, to achieve a good key touch at the key tops, each key top is supported on a main unit of the keyboard by an X-shaped pantograph, enabling free rising and falling of the key top.

Figure 4:
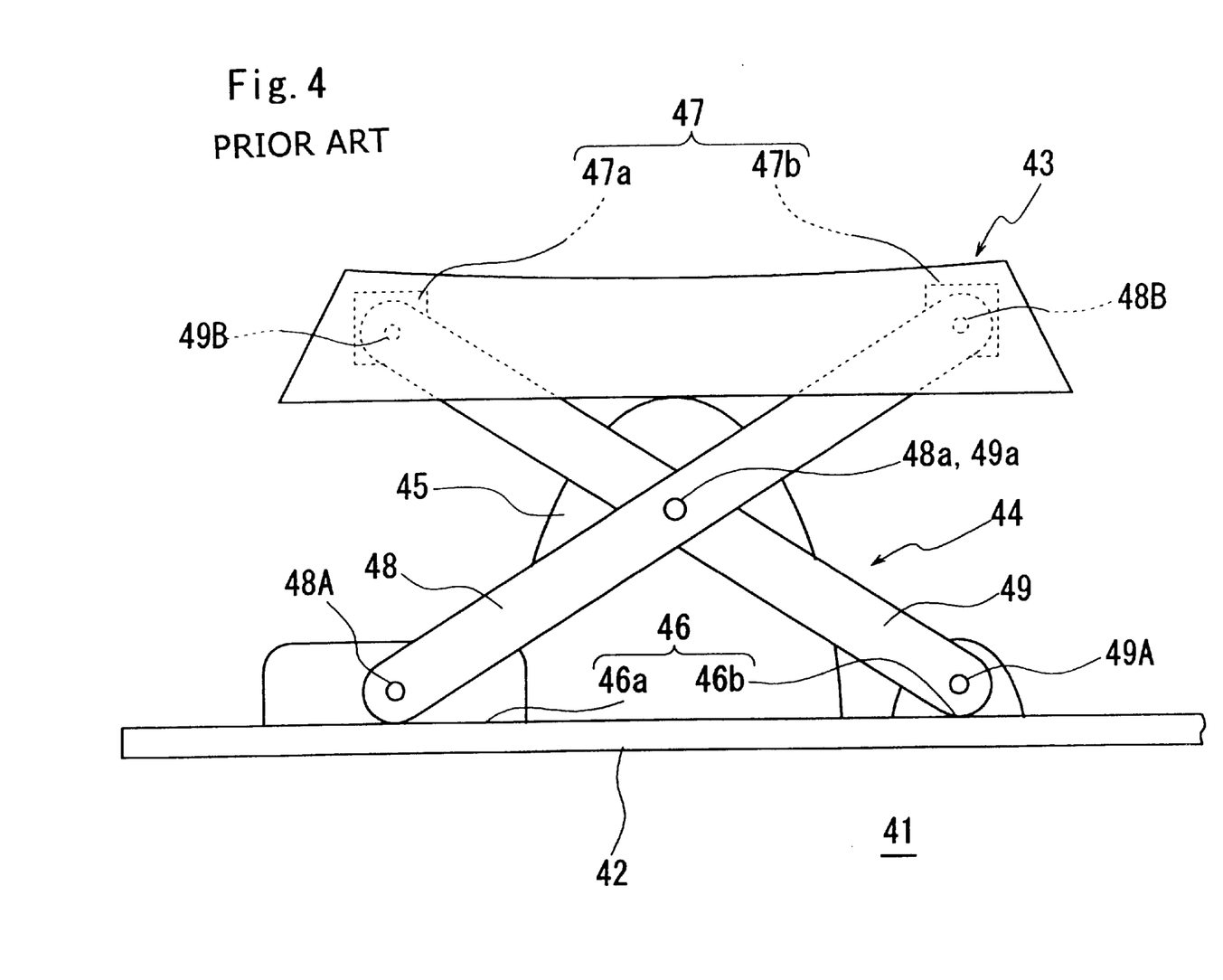
FIG. 4 is an enlarged side view of a key top support structure of a keyboard according to the prior art.

An example of this type of keyboard that was used in the past is shown in FIG. 4.

In the above-noted type keyboard, the keyboard mechanism 41 of which is shown in FIG. 4, has a keyboard 42 (key base), a key top 43 and a pantograph 44 as well as a resilient member 45.

Onto the key base 42 are placed the same number of contact parts (not shown in the drawing) as there are key tops. The key top 42 has a large number of pantograph pivot point support pairs 46, which support the key base side pivot points (to be described below) of the pantographs 44.

The pantograph pivot point support pair 46 has two pantograph pivot point supports 46a and 46b, which are arranged in a line.

There are a large number of key tops 43, which are each supported on the key base 42 by a pantograph 44, so as to enable free rising and falling, and which are also supported by a resilient member 45. Each key top 43 has a pantograph pivot point link pair 47, which links the key top side pivot points (to be described below) of the pantograph 44.

The pantograph pivot point link pair 47 has pantograph pivot point links 47a and 47b, which correspond to the pantograph pivot point supports 46a and 46b.

This pantograph 44 is an X-shaped pantograph that has two links 48 and 49 to which are linked the link center parts 48a and 49a so as to be able to freely rock to each other, the pantograph being disposed between the key base 42 and each one of the key tops 43 so as to allow free expansion and contraction therebetween.

The ends of the links 48 and 49 each have key base side pivot points 48A and 49A, which correspond to the pantograph pivot point supports 46a and 46b, and key top side pivot points 48B and 49B, which correspond to the pantograph pivot point links 47a and 47b.

The resilient member 45 is made of rubber and includes within it a contact part (not shown in the drawing) which corresponds to a contact part on the key base 42, and is disposed between each of the key tops 43 and the key base 42.

By virtue of this arrangement, when a key top 43 is pressed toward the key base 42, along with this pressing action, the resilient member 45 contracts, so that the contact part within the resilient member 45 comes into physical contact with a contact part on the key base 42. When the pressed condition of the key top 43 is released, the resilient member 45 expands, so the above-noted contact parts move away from each other.

In a keyboard mechanism of the past, however, because the mechanism is one in which the pantograph 44 expands and contracts in response to pressing and releasing a key top 43, when a key top is not in use, it is positioned at the topmost position, by means of the resilient member 45.

As a result, there arises the problem that the height-direction dimension of the key board when the key tops are not in use becomes large.

In the Japanese Unexamined Patent Publication (KOKAI) No. 8-22348, there is a proposal of an "information processing apparatus" which has a large number of key tops that can be supported by rubber springs on a base so as to freely rise and fall, and a balloon, which is disposed between these key tops and the base, and which is linked to a tube for the purpose of supplying and exhausting air.

In this type of keyboard mechanism, because the movement stroke of the keys in the key top height direction is adjusted by means of the air pressure within the balloon, the tube to supply air to the balloon and a valve to open and close the tube are required as a mechanism for adjustment of the key top height, this making the key top height adjustment mechanism complex.

In the Japanese Unexamined Patent Publication (KOKAI) No. 5-290673, there is a disclosure of prior art directed at a "keyboard apparatus" that has a guiding support member that guides and supports a pantograph in the up and down direction, and in the Japanese Unexamined Patent Publication (KOKAI) No. 5-298000, there is disclosure of prior art directed at a "keyboard apparatus" that has a cover that has a sliding groove which guides the up and down movement of a sheet member.

In the above-noted example of prior art, the adjustment of the movement stroke of the keys in the key top direction in the former case (Japanese Unexamined Patent Publication (KOKAI) No.5-290673) is that of moving a pantograph pivot point in a straight line direction, and in the latter case is that of performing this adjustment by moving inside of a cam groove, so that there is no change in the front-to-back movement of the key top, this causing the problem of poor visibility of the marking on the key top.

On the other hand, in the Japanese Unexamined Patent Publication (KOKAI) No.61-80718, although a key board used for electric devices is disclosed, it only shows a thin film key board without using a plurality of independent key tops but with a plurality of resilient plates each forming a respective switching means.

And the switching means of this Publication further is provided with a movable spacer which is caused to be moved in synchronization with a sliding motion of a power switching means so that when the power switching means is turned on, the movable spacer is moved so as to rise up the resilient plates whereby a projected portion will be created on a surface of the thin film.

On the other hand, when the power switch is turned off, the resilient plates are moved oppositely so as to retract the projected portion from the surface of the thin film.

Therefore, this publication does not show a key board having a configuration in that a height of each one of the key tops can be changed in response to the movement of the key top cover.

Further, in the Japanese Unexamined Patent Publication (KOKAI) No. 6-36649, although a key board provided with a plurality of key-tops each having a pantograph mechanism, the height of each of the key-top of the publication is fixed and thus it cannot be changed in synchronization with a movement of a key top cover.

Accordingly, in consideration of the above-noted problems accompanying the prior art, it is an object of the present invention to provide a keyboard mechanism which, by causing the pivot at one side of the pantograph to move with a swinging motion so as to move apart from a surface of a key base, enables a reduction of the size of the keyboard in the height direction while simplifying the mechanism for adjusting the key top height, and also achieves good visibility of the marking on the key top.

SUMMARY OF THE INVENTION

In order to achieve the above-noted object, the present invention has the following described basic technical constitution.

The first aspect of a keyboard apparatus of the present invention comprises a key base, a plurality of key tops that are disposed on the key base in matrixed matrixes configuration and a plurality of pantograph mechanisms each being provided on each one of the key tops, respectively so as to connect each of the key top to the key base, respectively, wherein the pantograph mechanism comprises a first and a second pantograph units, a first end portion of the first and second pantograph units being pivotally connected to a part of the key top, while a second end portion of the first pantograph unit being pivotally connected to a portion of the key base and a second end portion of the second pantograph unit being detachably connected to a portion of the key base.

And the second aspect of a keyboard apparatus of the present invention which has more specific configuration than the first aspect, comprises a key base that has a large number of X-shaped pantograph pivot point support pairs that are arranged in line with a prescribed spacing therebetween, and a large number of key tops that are disposed on the key base via an X-shaped pantograph, so as to freely move upward and downward, and that have pantograph pivot point linking pairs that correspond to each of the pantograph pivot point support pairs, wherein each key base side pivot point pair on one side of the pantograph is supported on the key base, the keyboard apparatus further comprising a key top height adjusting mechanism that has a holder that supports the other side's pivot point and a reciprocating link that links in a swingable manner, the holder of this key top height adjusting mechanism being swung in response to a reciprocating motion of the reciprocating link.

Since the keyboard apparatus of the present invention is basically configured as mentioned above, the keyboard apparatus of the present invention shows advantages such as, in addition to supporting on a key base a pivot point on one side of a pantograph, a holder that supports a pivot point on the other side and a key top height adjusting mechanism that has a holder that supports the pivot point on the other side a reciprocating link that links in a swingable manner and this holder are also supported, the holder of this key top height adjusting mechanism swinging in response to a reciprocal movement of the reciprocating link, the result being that, when the reciprocal link reciprocates, accompanying the reciprocal movement the height of the key top with respect to the key base is adjusted.

DESCRIPTION OF THE PREFERRED EMBODIMENTS

Preferred embodiments of the present invention are described in detail below, with references being made to the relevant accompanying drawings.

Figure 1:
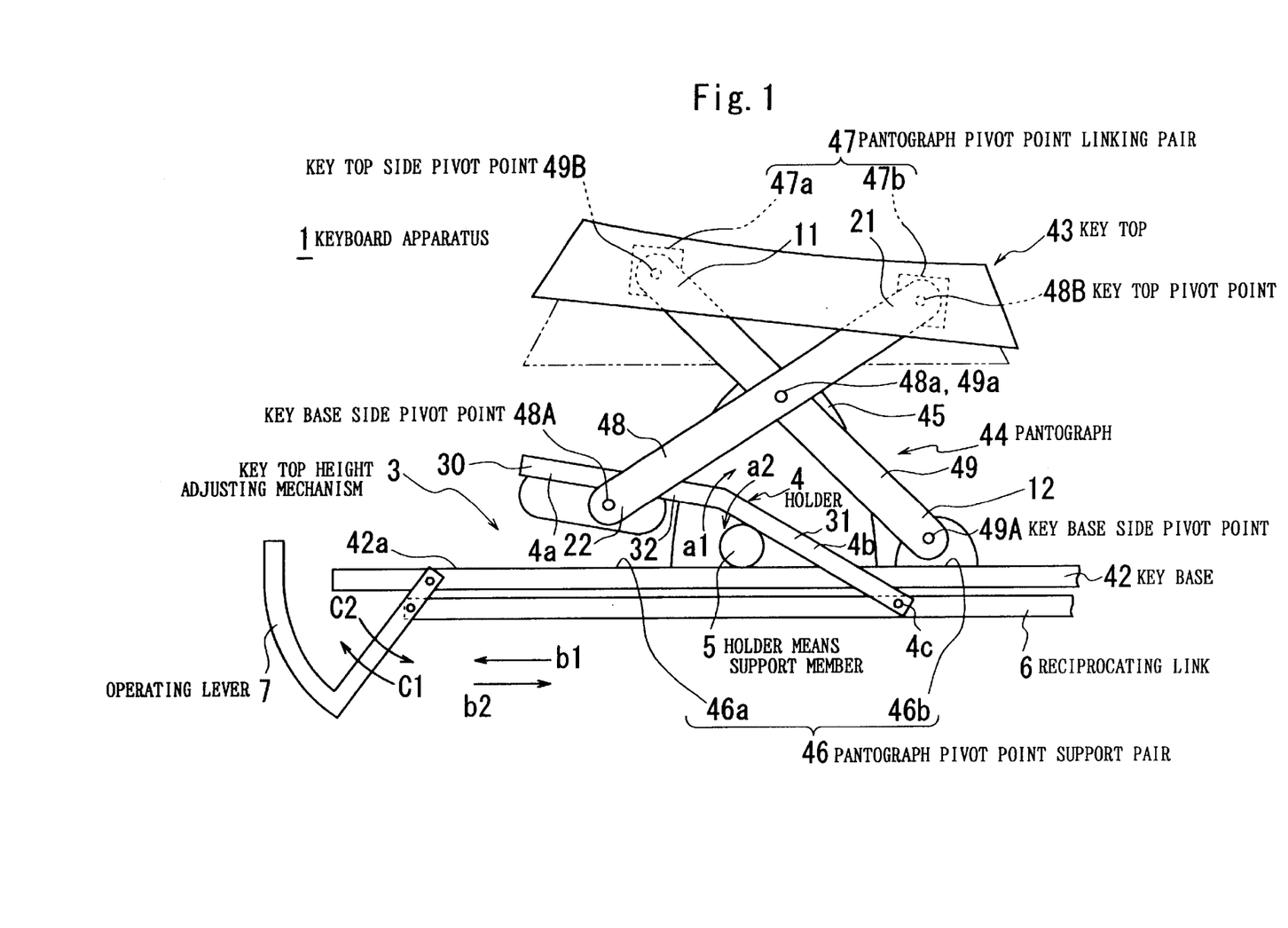
FIG. 1 is an enlarged side view of the main parts of a keyboard according to the first embodiment of the present invention.
Figure 2:
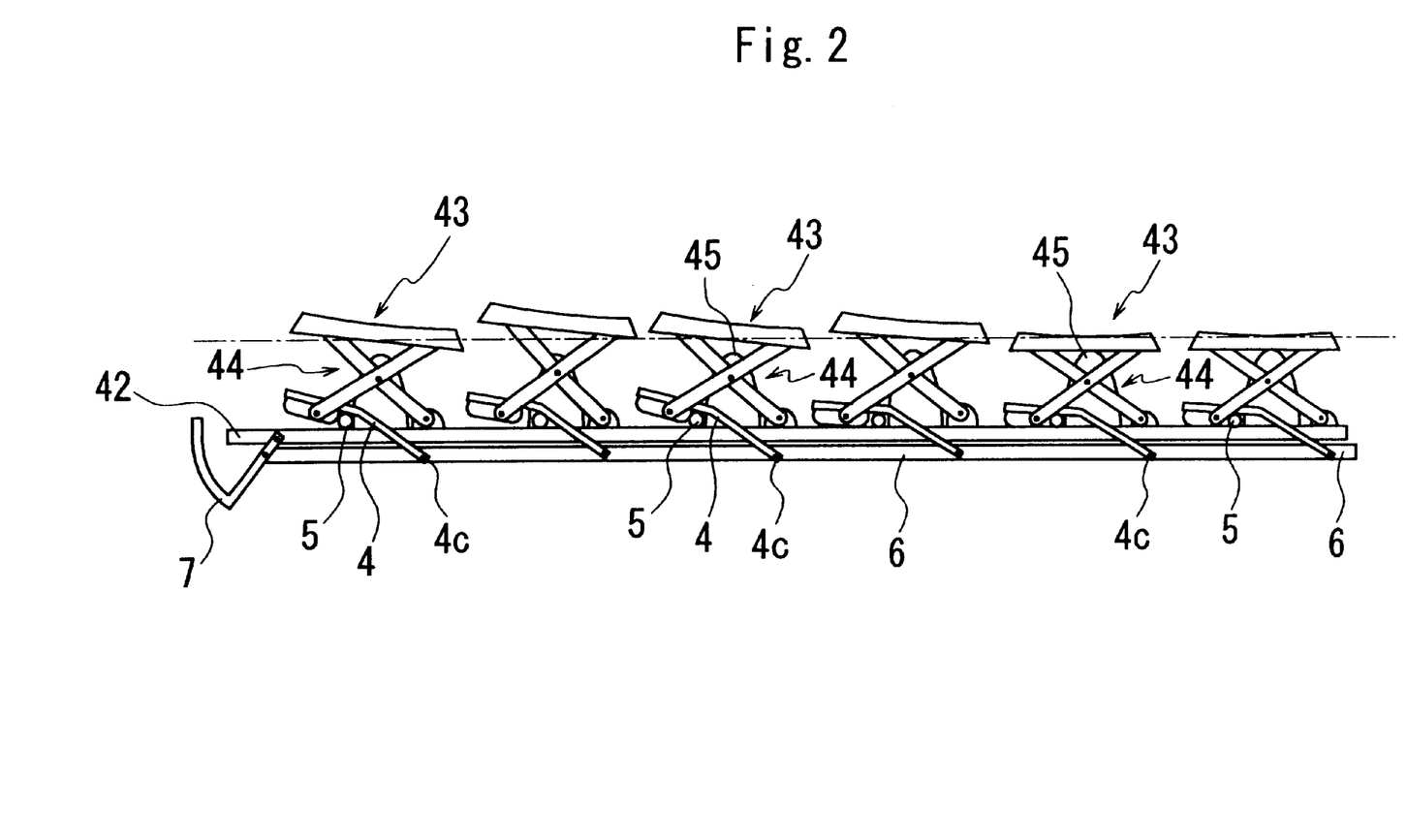
FIG. 2 is a side view that shows the internal construction of a keyboard apparatus according to the first embodiment of the present invention.
Figure 3:
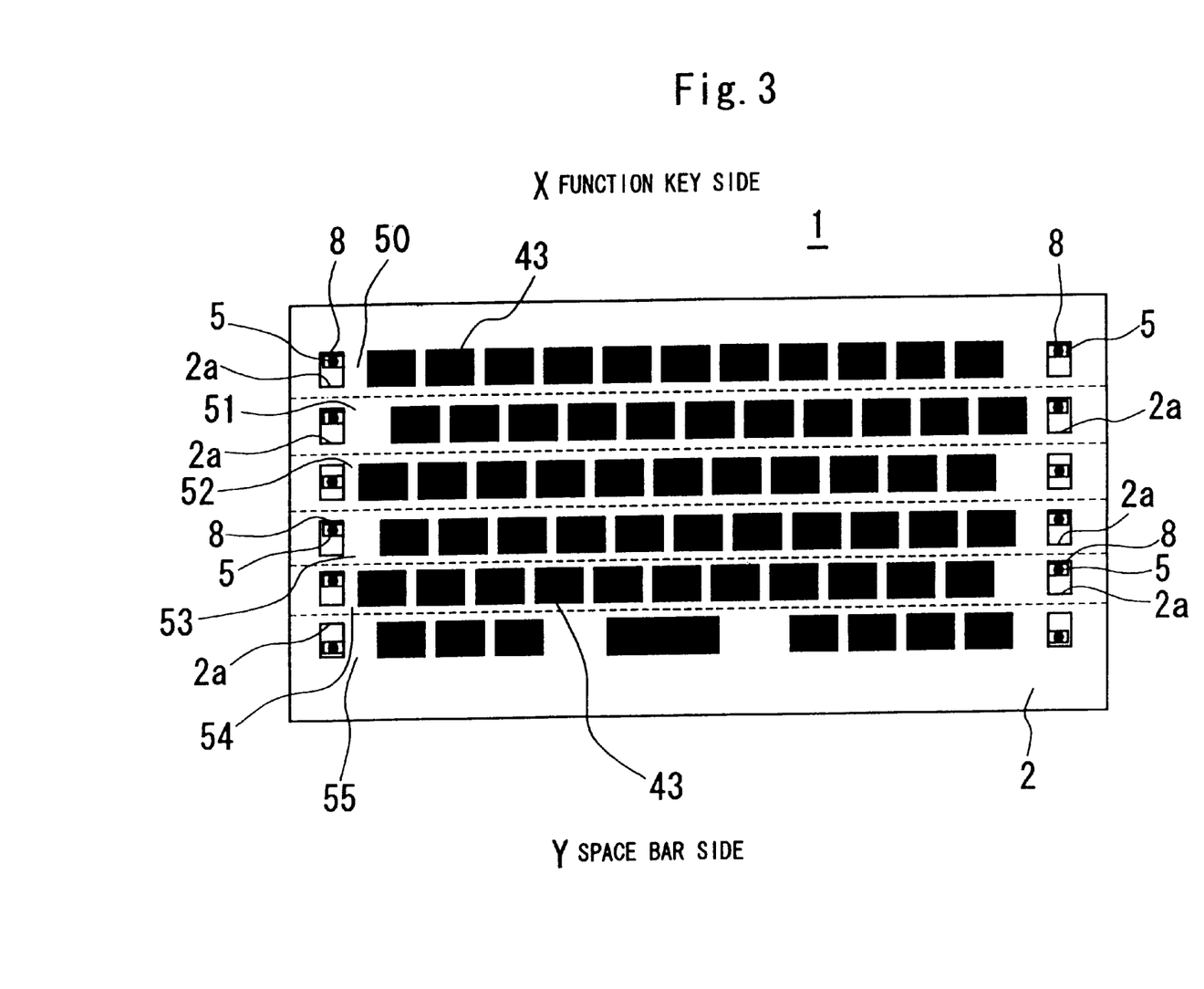
FIG. 3 is a plan view which shows a keyboard according to the first embodiment of the present invention.

FIG. 1 is an enlarged side view of that shows the internal construction of a keyboard apparatus according to the first embodiment of the present invention, FIG. 2 is a side view that shows the internal construction of the above-noted keyboard according to the present invention, FIG. 3 is a plan view that shows a keyboard apparatus according to the present invention, with elements in FIG. 1 that are identical with elements in FIG. 4 being assigned the same reference numerals.

In FIG. 1 to FIG. 3, the keyboard apparatus 1 has an apparatus enclosure 2, a key base 42, a key top 43, a pantograph 44, a resilient member 45, and a key top height adjusting mechanism 3.

In these figures, a keyboard apparatus 1 of the present invention is disclosed in that the keyboard apparatus 1 comprises a key base 42, a plurality of key tops 43 that are disposed on the key base 42 in a matrixed configuration and a plurality of pantograph mechanisms 44 each being provided on each one of the key tops 43, respectively, so as to connect each of the key top 43 to the key base 42, respectively, wherein the pantograph mechanism 44 comprises a first and a second pantograph units 49, 48, a first end portion 11 and 21 of the first and second pantograph units 49 and 48, respectively, being pivotally connected to a part of the key top 43, while a second end portion 12 of the first pantograph unit 49 being pivotally connected to a portion of the key base 42 and a second end portion 22 of the second pantograph unit 48 being detatchably connected to a portion of the key base 42.

In the keyboard apparatus of the present invention, the second end portion 22 of the second pantograph unit 48 is configured so as to pivotally move with respect to the connected portion formed between the second end portion 12 of the first pantograph unit 49 and the portion of the key base 42, as a center of axis.

Further, in the keyboard apparatus of the present invention, the pivotal movement of the second end portion 22 of the second pantograph unit 48 is caused in response to a reciprocating motion of a reciprocating link 6 in parallel with the key base 42, and the reciprocating link 6 being adjacently provided to the key base 42.

On the other hand, in the keyboard apparatus of the present invention, the second end portion 22 of the second pantograph unit 48 is connected to one end portion 30 of a holder means 4, and another end 31 of the holder means 4 is connected to a portion of the reciprocating link 6.

More over, in the keyboard apparatus of the present invention, the holder means 4 is provided with a bending portion 32 on a portion of the holder means 4.

In the present invention, a desired portion of the holder means 4 is preferably contacted to a part of a holder means supporting member 5 which is disposed on the key base 42.

In the present invention, the holder means supporting member 5 is slidably disposed in a longitudinal direction of the holder means 4 on the key base 42, preferably.

On the other hand, in the present invention, the reciprocating link 6 is caused to be reciprocally moved in response to an opening or a closing operation of a key top cover (not shown in Figs.) of the key board apparatus 1.

Further, in the present invention, the holder means supporting member 5 being disposed along a respective lines 50, 51, 52, 53, 54, 55 ... in each of which a plurality of the key tops 43 are adjacently arranged to each other.

In the present invention, a position of the holder means supporting member 5 may be adjusted with a operation lever 8 provided on a peripheral surface area of the keyboard apparatus 1.

And in the present invention, the height of the key top 43 can be mandatory adjusted by controlling a position of the holder means supporting member 5.

In addition to this, in the present invention, the height of each one of key tops 43 in one group can be adjusted simultaneously and independently from those of other key tops of other groups.

As mentioned above, each of the key tops 43 belonging to the one group, form one line of the key board in a key board apparatus 1.

A specific embodiment of the keyboard apparatus 1 of the present invention will be explained as an example referring to FIGS. 1 to 3, hereunder.

The apparatus enclosure 2 has a large number of apertures 2a which are arranged in lines on both sides of the surface of the front thereof, from the space bar side y (operator side) to the function key side x, and houses within it the constituent components of the keyboard apparatus 1, which includes the key base 42 and the key top height adjusting mechanism 3.

On the function key side of the apparatus enclosure (side opposite from the operator), is swingably mounted an apparatus cover (not shown in the drawings), on the reverse side of which is a liquid-crystal display (not shown in the drawings).

The key top height adjusting mechanism 3 has a holder means 4, a holder means support member 5, a reciprocating link 6, an operating lever 7, and a key top cover, that is an apparatus enclosure 2.

The holder means 4 is formed by a swinging link that has a horizontal part 4a that is positioned on the pantograph side and an inclined part 4b that is positioned on the reciprocating link side, the reciprocating link 6 being pivotally supported via the holder pivot point 4c, so as to swing freely in the a1 and a2 directions.

The horizontal part 4a is linked to the key base side pivot point 48a of the pantograph 44. The inclined part 4b of the holder means 4 is linked by the reciprocating link 6 and supported by the holder means support member 5.

By virtue of this arrangement, when the swing of the holder means 4 causes the key base side pivot point 48A to be displaced from above the key base 42 in the direction of the arrow a1, not only is the inclined part 4b, but also the horizontal part 4a is also inclined with respect to the base surface 42a of the key base 42, and when the key base side pivot point 48A is supported on the key base 42, the horizontal part 4a is parallel to the base surface 42a of the key base 42.

The holder means support member 5 supports the holder means 4, and is formed by a supporting rod of circular cross section that is capable of moving in a direction that is parallel to the reciprocating movement of the reciprocating link 6 (by approximately several millimeters), this being provided on the key base 42.

By doing this, when the reciprocating link 6 reciprocates along directions as shown by b1 and b2, the holder means 4 swings in the directions of the arrows a1 and a2, supported by the holder means support member 5.

The position movement of the holder means support member 5 cause a change in the maximum angle of swing of the holder means 4, thereby changing the maximum stroke of the key top 43 in the height direction.

Figure 6:
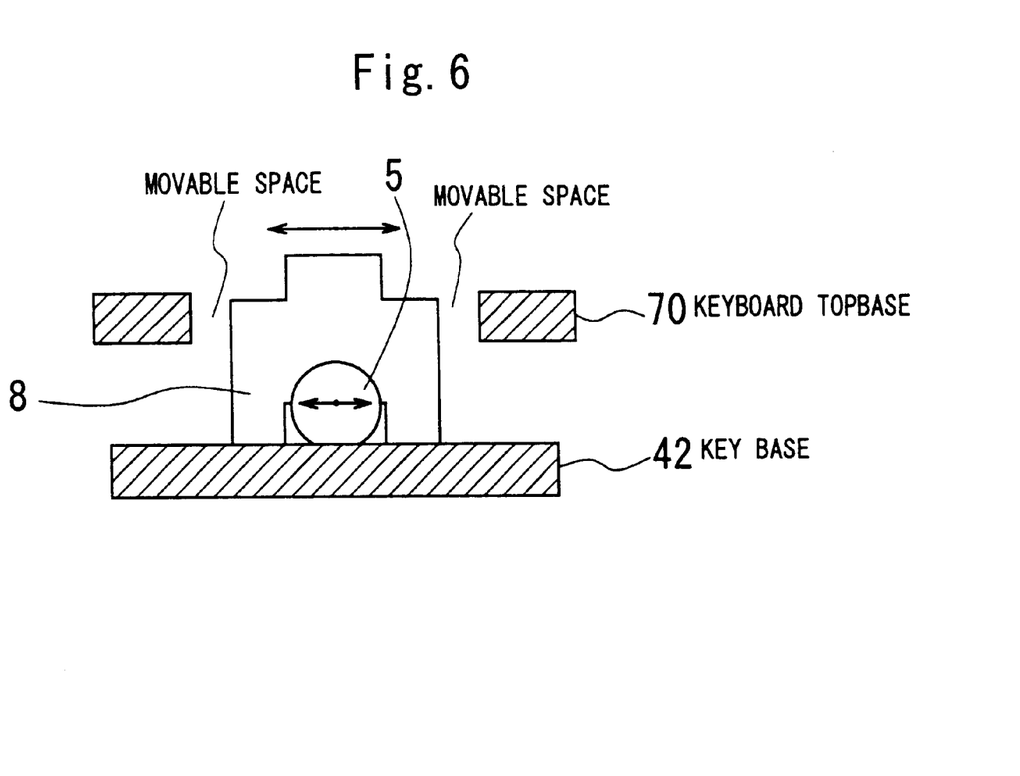
FIG. 6 is a side view that shows a positional relationship among the holder support member, the key base and the operating lever.

As shown in FIG. 6, which is a cross sectional view of an end portion of the holder means support member 5, seeing from the A–A' line, the movement operating lever 8 of the holder means support member 5, which is shown in FIG. 3, is positioned within the aperture 2a, and protrudes at both ends of the holder means support member 5.

Figure 7:
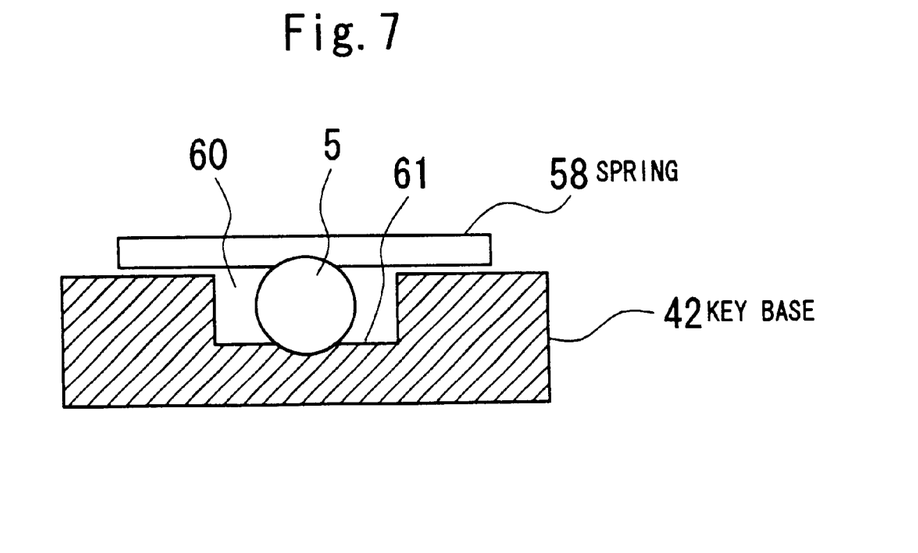
FIG. 7 is a side view that shows a positional relationship between the holder support member and the key base.

On the other hand, as shown in FIG. 7, which is a cross sectional view of an end portion of the holder means support member 5, seeing from the B–B' line, both ends of the holder means support member 5 are pressed down against the inside bottom 61 of a depression 60 on the top of the key base 42 by a support member positioning leaf spring 58.

In this case, the depression 60 is formed continuously in the reciprocating direction of the reciprocating link 6, and in each of these depressions 60 a holder means support member 5 is disposed so as to move, thereby enabling the fine adjustment of the stroke of the key top in the height direction (of approximately 1 to 2 millimeters).

Next, one embodiment of a configuration and a function of the holder means support member 5, will be explained hereunder, with reference to FIG. 5.

Figure 5:
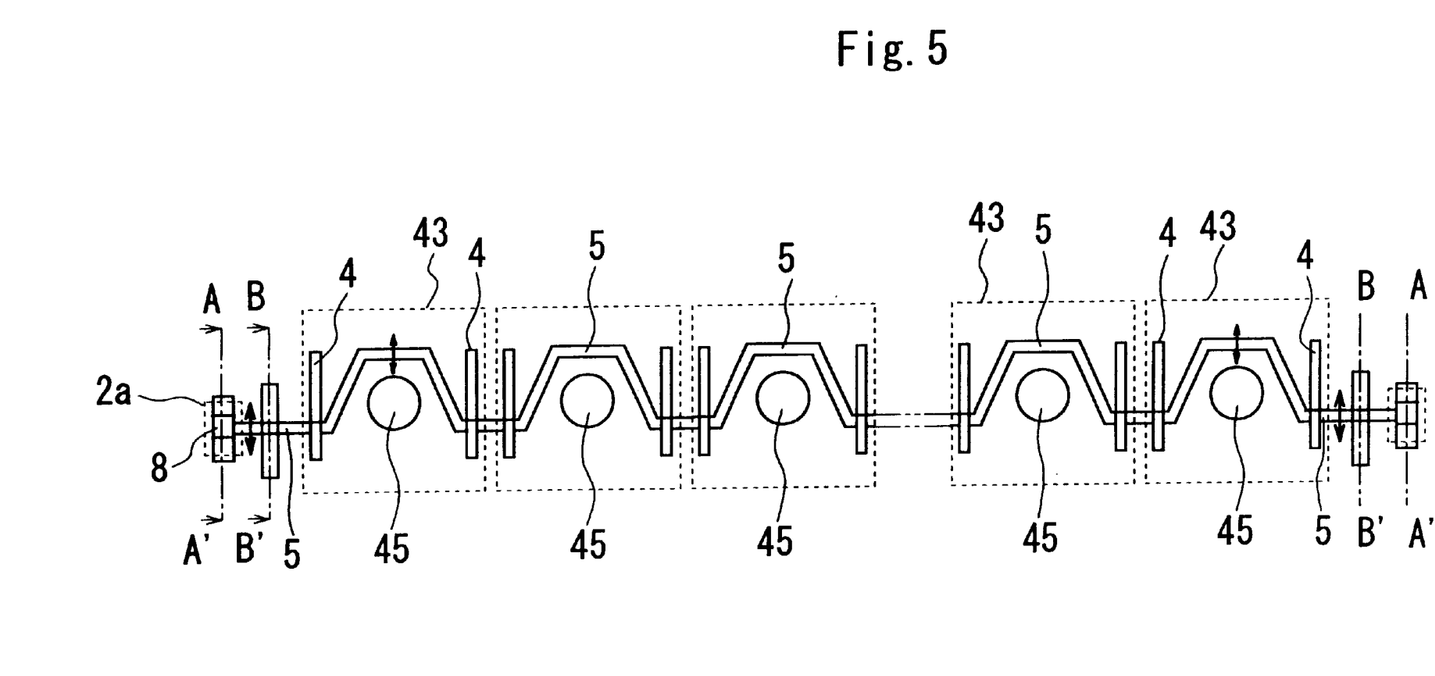
FIG. 5 is an enlarged plane view showing configuration of the holder and the holder support member and a positional relationship therebetween.

FIG. 5 show a plane view of one embodiment of the holder means support member 5 of the present invention and it shows the configuration of one line of the key top lines 50, ... , 55.

Note than, in one line of the key tops arrangement, a plurality of the key tops 43 are closely and adjacently arranged to each other in side by side condition and a center portion of each one of the key top 43, a resilient member 45 having a spring effect with a oval configuration is provided so as to contact to a back side surface of the key top 43.

On the other hand, as shown in FIG. 5, the holder means support member 5 is disposed along the line of the key top 43 with zig zag configurations each being provided on the holder means support member 5 and in the vicinity of the resilient member 45, so as not to be abutted to each other.

And further both ends of the holder means support member 5 are fixed to the key base 42 as shown in FIGS. 6 and 7 as mentioned above so as to be secured and to be capable of being manually displaced.

More over, as shown in FIG. 5, at least one of the holder means 4, preferably a pair of the holder means 4 is provided under each one of the key tops 43 so as to contact the holder means support member 5 as the key top height adjusting member.

The reciprocating link 6 is a planar matrix reciprocating link that links each one of the holder means 4 in a freely swingable manner, this being provided parallely adjacent to the key base 42 so as to reciprocate freely in the directions of arrows b1 and b2.

The reciprocating link 6 has a spring force constantly applied thereto so as to be biased in the direction that makes the key top height high by swinging of the holder means 4.

The operating lever 7 to move the reciprocating link 6, swings in the directions of the arrows c1 and c2 by the opening and closing of the key top cover, and is used to detect the opening and closing of the cover, which applies a reciprocating force to the reciprocating link 6, which is provided on a surface of the key board 1 and at the function key side.

By means of this structure, when the key top cover is opened and closed to adjust the key top 43 height, the operating lever 7 swings in the directions of the arrows c1 and c2 and, accompanying this swinging action the reciprocating link 6 reciprocates in the directions of the arrows b1 and b2.

Accompanying the reciprocating motion of the reciprocating link 6, the holder means 4 swings in the directions of the arrows a1 and a2. In this case, in response to the open/closed position of the key top cover, maximum height direction position and minimum height direction position of the key tops 43 are established.

As explained above, one of the characteristic embodiment of the keyboard apparatus 1 of the present invention, comprises a key base that has a large number of pantograph pivot point support pairs that are arranged in line with a predetermined spacing therebetween, and a large number of key tops that are disposed on the key base via an X-shaped pantograph, so as to freely move upward and downward, and that have pantograph pivot point linking pairs that correspond to each of the pantograph pivot point support pairs, wherein one of the key base side pivot point of each one of the key base side pivot point pair provided on the pantograph is supported on the key base, the keyboard apparatus further comprising a key top height adjusting mechanism that has a holder means that supports another key base side pivot point of pair and a reciprocating link that links the holder means in a swingable manner, the holder means of this key top height adjusting mechanism being swung in response to a reciprocating motion of the reciprocating link.

In the embodiment of the present invention as mentioned above, the keyboard apparatus further comprises a swinging link comprising a horizontal part that is positioned at the pantograph side and an inclined part that is positioned at the reciprocating link side.

In addition to this, the keyboard apparatus may further comprise a holder means supporting member that supports the holder means on the key base.

And the keyboard apparatus of the present invention, the holder means support member is preferably movable in a direction that is parallel to the direction of reciprocation of the reciprocating link.

More over, the keyboard apparatus of the present invention, may comprise an operating lever that applies forward and reverse force to the reciprocating link, the lever being provided in a freely swingable manner on the key base.

Note that, the the operating lever as used in the keyboard apparatus of the present invention, may preferably swing in response to the opening and closing of a key top cover.

In other words, specifically, a keyboard mechanism as used in the key board apparatus, may have a key base which has a large number of pantograph pivot point support pairs which are arranged in a line at a prescribed interval therebetween, and a large number of key tops that have pantograph pivot point links that correspond to each of the pantograph pivot point support parts and which are disposed with an intervening X-shaped pantograph onto the key base in a manner that allows their free movement up and down.

In addition to supporting on the key base a pivot point on one side of each key base side pivot point pair of the pantograph, a key top height adjusting mechanism is also supported thereon, this key top height adjusting mechanism having a holder, which supports the other side pivot point, and a reciprocating link that links in a swingable manner to this holder, the holder of this key top height adjusting mechanism swinging in accordance with the reciprocating action of the reciprocating link.

Therefore, when the reciprocating link reciprocates, accompanying this reciprocating movement the holder swings so as to adjust the height of the key top with respect to the key base.

The holder which is used in the present invention, is preferably a swinging link that has a horizontal part that is positioned at the pantograph side and an inclined part that is positioned as the reciprocating link side.

Therefore, when, by virtue of the swinging of the holder, the key base side pivot point on one side is distance from the key base, not only the inclined part but also the horizontal part becomes inclined with respect to the key base, and when this key base side pivot point is held on the key base, the horizontal part is parallel to the key base.

In the keyboard apparatus of the present invention, it is also preferable that there is a holder means support member that supports the holder is provided on the key base.

Therefore, when the reciprocating link reciprocates, the holder swings into the condition in which it is supported by this holder means support member.

Further in the keyboard apparatus of the present invention, the holder means support member may be a holder means support member capable of moving in a direction that is parallel to the reciprocating direction of the reciprocating link.

Therefore, by virtue of the movement position of the holder means support member, the maximum swing angle of the holder changes, thereby changing the maximum stroke of the key top in the height direction.

More over, in the keyboard of the present invention, the operating lever which applies force to the reciprocating link is preferably provided in a swingable manner on the key base.

Therefore, when the reciprocating link is operated by this lever, accompanying the reciprocating action, the holder swings, so as to adjust the height of the key top with respect to the key base.

Further in the keyboard of the present invention, the operating lever is caused to swing by the opening and closing of the key top cover.

Therefore, when adjusting the key top height, if the key top cover is opened and closed, the operating lever swings.

The key top raising and lowering operation of a keyboard 4 configured such as described above is described below, with reference to FIG. 1.

First, turning to the operating of raising the key top 43, this operation is performed by swinging the key top cover in the opening direction.

That is, when the key top cover is swung in the opening direction, the operating lever 7 swings in the direction of the arrow c1 and, accompanying this swinging action, the reciprocating link 6 is moved in the direction of the arrow b1 by means of the repelling force of the spring.

Then, as a result of the motion of the reciprocating link 6 in one direction, the holder means 4 receives a swinging force from the holder means support member 5 in the direction of the arrow a1, the result being that the holding position of the holder means 4 is displaced from the horizontal part 4a to the inclined part 4b.

Thus, it is possible to raise the key top 43.

In this case, the key top 43 moves in the horizontal direction and the vertical direction so as to become inclined with respect to the base surface 42a of the key base 42.

Next, the operation of lowering the key top 43 will be described.

The operating of lowering the key top 43 is performed by swinging the key top cover in the closing direction.

That is, when the key top cover is swung in the closing direction, the operating lever 7 swings in the direction of the arrow c2 and, accompanying this swinging action, the reciprocating link 6 resists the force of the spring and travels forward in the direction of the arrow b2.

The forward movement of the reciprocating link 6 cause the holder means 4 to receive a swinging force in the direction of the arrow a2, the result being that the holding position of the holder means support member 5 is displaced from the inclined part 4b to the horizontal part 4a.

Thus the key top 43 can be operated to be lowered.

In this embodiment of the present invention, therefore, when the reciprocating link 6 reciprocates, accompanying this reciprocating motion the holder means 4 swings, thereby adjusting the height of the key top 43 with respect to the key base 42, so that there is a certain reduction of the height of the keyboard when the key tops are not being used.

In this case, by adjusting the movement of the holder means support member 5, it is possible to incline the key top 43 when the key top is being used to a height position setting that is set by the user, thereby enabling the achievement of a user interface that is similar to that with a keyboard of a desktop type personal computer.

In this embodiment, although the description was for the case in which the function key side pivot point of the key top 43 is supported by the holder means 4, so that when in use the function key side pivot point (key base side pivot point 48A) is higher than the space key side pivot point (key base side pivot point 49A), the present invention does not present a restriction in this regard and, as a second embodiment, it is possible to have the space key side pivot point supported, so that in use the space key side pivot point is higher than the function key side pivot point.

Additionally, in the embodiment described, although the resilient member 45 was a rubber and having a configuration of oval shape, for example, the same as in the prior art, in a third embodiment of the present invention by making the height direction dimension of the rubber large, it is possible to achieve a stroke in the height direction of the key top that is larger than with the first embodiment.

Additionally, in this present invention by using a leaf spring in place of the resilient member 45 (rubber) as a holder with a contact part in a fourth embodiment thereof, it is possible to position the key top when not being used lower than in the case of the first embodiment.

In this case, for example, the bottom of the pantograph pivot point side (horizontal part 4a) of the holder means 4 shown in FIG. 1 is formed as a protrusion in an approximate parabolic shape, with the end part thereof being provided with a contact point so as to be opposite a contact point on the key base 42, so that when in use the key base side contact point and the holder side contact are brought into contact by means of the elastic deflection of the holder caused by a pressure applied to the key top, and when not in use, even if the key top is at the bottom-most position, the above-noted contact points are not in contact with one another.

According to the present invention as described in detail above, in addition to supporting on a key base a pivot point on one side of a pantograph, a holder that supports a pivot point on the other side and a key top height adjusting mechanism that has a holder that supports the pivot point on the other side a reciprocating link that links in a swingable manner and this holder are also supported, the holder of this key top height adjusting mechanism swinging in response to a reciprocal movement of the reciprocating link, the result being that, when the reciprocal link reciprocates, accompanying the reciprocal movement the height of the key top with respect to the key base is adjusted.

It is therefore possible to shorten the height dimension of the keyboard when the key top is not in use, making it possible to make the keyboard compact in the height direction.

Also, because the key top height direction movement stroke adjustment is performed by converting the reciprocating movement of the reciprocating link to a swinging movement of the holder, it is possible to obtain a simplified key top height adjusting mechanism.

Because the swinging movement of the holder in use causes the key top to be inclined in the direction of the operator, there is also the advantage of being able to achieve good visibility of the marking on the key top.

What is claimed is:

1. A keyboard apparatus comprising:
   a key base;
   a plurality of key tops that are disposed on said key base in matrixed configuration; and
   a plurality of pantograph mechanisms each being provided for each one of said key tops, respectively, so as to connect each of said key tops to said key base, respectively,
   wherein said pantograph mechanism comprises first and second pantograph units, first end portions of said first and second pantograph units being pivotally connected to said key top, while a second end portion of said first pantograph unit being pivotally connected to a first portion of said key base and a second end portion of said second pantograph unit being detachably connected to a second portion of said key base, whereby said second end portion of said second pantograph unit is movable pivotally away from or toward said second portion of said key base.

2. A keyboard apparatus comprising:

a key base;

a plurality of key tops that are disposed on said key base in matrixed configuration;

a plurality of pantograph mechanisms each being provided for each one of said key tops, respectively, so as to connect each of said key tops to said key base, respectively, wherein said pantograph mechanism comprises first and second pantograph units, first end portions of said first and second pantograph units being pivotally connected to said key top, while a second end portion of said first pantograph unit being pivotally connected to a first portion of said key base and a second end portion of said second pantograph unit being detachably connected to a second portion of said key base;

said keyboard apparatus further comprising a connected portion formed between said second end portion of said first pantograph unit and said first portion of said key base, wherein said second end portion of said second pantograph unit pivotally moves with respect to said connected portion, as a pivot point.

3. A keyboard apparatus according to claim 2 further comprising a reciprocating link adjacently provided on said key base, wherein said pivotal movement of said second end portion of said second pantograph unit is caused in response to a reciprocating motion of said reciprocating link in parallel with said key base.

4. A keyboard apparatus according to claim 3, wherein said second end portion of said second pantograph unit is connected to one end portion of a holder, the other end portion of said holder being connected to a portion of said reciprocating link.

5. A keyboard apparatus according to claim 3, wherein said reciprocating link is caused to be reciprocally moved in response to an opening or a closing operation of a key top cover of said keyboard apparatus.

* * * * *